US005397482A

United States Patent [19]

Castrantas et al.

[11] Patent Number: 5,397,482

[45] Date of Patent: Mar. 14, 1995

[54] TREATMENT OF CYANIDES IN EFFLUENTS WITH CARO'S ACID

[75] Inventors: Harry M. Castrantas, Newtown, Pa.; James L. Manganaro, Princeton, N.J.; Craig W. Rautiola, Elko, Nev.; James Carmichael, Buffalo, N.Y.

[73] Assignee: FMC Corporation, Philadelphia, Pa.

[21] Appl. No.: 100,908

[22] Filed: Aug. 3, 1993

[51] Int. Cl.[6] .................................................. C02F 1/58

[52] U.S. Cl. ..................................... 210/759; 210/904

[58] Field of Search ......................... 210/743, 759, 904

[56] References Cited

U.S. PATENT DOCUMENTS 3,900,555 8/1975 Jourdon-Laforte ................. 210/759
4,416,786 11/1983 Knorre et al. ...................... 210/904
4,915,849 4/1990 Griffiths et al. .................... 210/904
5,137,642 8/1992 Castrantas et al. ................. 210/904

*Primary Examiner*—Thomas Wyse
*Attorney, Agent, or Firm*—Frank Ianno; Patrick C. Baker

[57] ABSTRACT

A process for treating effluents, such as precious metal tailings, having a pH of at least 9 and containing cyanide is described in which Caro's acid is added to the effluent having a pH of at least 9 and commencing the reaction of the cyanide with Caro's acid at 0° C. to 80° C. in the absence of an added alkali; adding sufficient Caro's acid within a mole ratio of Caro's acid to cyanide of 0.3/1 to 3/1 to reduce the pH of the effluent to below 9, continuing the reaction between Caro's acid and the cyanide to reduce the amount of cyanide remaining in the effluent and to recover an environmentally compatible effluent reduced in amounts of cyanide.

10 Claims, 1 Drawing Sheet

TREATMENT OF CYANIDES IN EFFLUENTS WITH CARO'S ACID

FIELD OF THE INVENTION

The invention is in the field of cyanide-containing effluents, such as gold mine tailing slurries, to reduce their cyanide levels with peroxymonosulfuric acid to environmentally acceptable levels.

DESCRIPTION OF THE PRIOR ART

Caro's acid, which is peroxymonosulfuric acid, is a strong.oxidizing compound which has been suggested for use in many applications including purification of cyanide-containing effluents by conversion of their cyanides into non-toxic derivatives. Caro's acid is usually produced by reacting together concentrated sulfuric acid (85% to 98% by weight $H_2SO_4$) with concentrated hydrogen peroxide (50% to 90% by weight $H_2O_2$) to produce an equilibrium mixture of Caro's acid containing peroxymonosulfuric acid ($H_2SO_5$), sulfuric acid and hydrogen peroxide. However, since the Caro's acid is not stable for long periods it must be made and immediately used on site. In general, the Caro's acid is manufactured on site as needed and in just the amounts required for the specified application without the necessity of having to store any excess amounts.

One procedure for producing Caro's acid is set forth in U.S. Pat. No. 3,900,555 by using an apparatus described in U.S. Pat. No. 3,939,072 for mixing the sulfuric acid and hydrogen peroxide and cooling the mixture with a water-cooled jacket to prevent overheating of the reactants and premature decomposition of the monoperoxysulfuric acid product. These patents teach the use of the monoperoxysulfuric acid product for treating waste aqueous effluents from an electroplating plant containing cyanide ions while simultaneously adding an alkali in amounts suitable for neutralizing the added acid. This assures that the pH of the treated solution is maintained at a specified alkaline value, normally pH 9, by neutralizing any acidity resulting from the added acid.

Another procedure is set forth in U.S. Pat. No. 4,915,849 wherein the Caro's acid is used to treat cyanide-containing effluents from an ore-processing plant. The Caro's acid is manufactured by reacting sulfuric acid with hydrogen peroxide in proportions corresponding to between 0.01 and 0.5 moles of sulfuric acid per mole of hydrogen peroxide. The resulting acid is then added to the cyanide-containing effluent simultaneous with aqueous lime or sodium hydroxide mixtures in order to maintain the effluent at the preferred pH of between 9.5 and 11.5.

In the prior art, as exemplified by the above cited patents, it has been the general practice to carry out the reaction of Caro's acid and cyanides under alkaline conditions at a pH of at least 9 and usually above 9, typically 10.5 to 11.5. To assure that the pH of the cyanide-containing effluent does not drop below 9, it is usual to add an alkali, such as lime or sodium hydroxide, along with the Caro's acid in amounts that will neutralize any acidity resulting from the added Caro's acid.

The rational for always maintaining the cyanide-containing effluent at a pH of 9 and above is twofold. Initially, at a pH below 9 it has been reported that cyanide in the cyanide-containing effluent will be converted to volatile and toxic hydrogen cyanide. By employing alkali addition with Caro's acid or by maintaining a high initial alkalinity using added alkali, the cyanide-containing solution which is being treated with Caro's acid can always be maintained at a pH 9 or above and thus obviate any chance of the purported hydrogen cyanide evolution taking place. The second reason is that the reaction of cyanides with Caro's acid is reported to be optimum at a pH of 9. The cyanides normally referred to in such reaction are the "free cyanides" such as sodium cyanide which are not complexed.

SUMMARY OF THE INVENTION

We have now found a process for treating an effluent containing cyanide and having a pH of at least 9 to reduce its cyanide content by:

a) adding Caro's acid to the effluent having a pH of at least 9 and commencing the reaction of the cyanide with Caro's acid at a temperature of about 0° C. to about 80° C., b) adding sufficient amount of Caro's acid within the mole ratio of Caro's acid to cyanide of about 0.3/1 to about 3/1 to reduce the pH of the effluent to below 9, c) continuing to react the cyanide values in the effluent having a pH below 9 with the Caro's acid, d) reducing the amount of cyanide remaining in the effluent, and e) recovering an environmentally compatible effluent having lower amounts of cyanide.

The above process has been found to generate either no detectable amounts of hydrogen cyanide gas or if detectable too low to be consequential when carried out as set forth above at below pH 9; further, carrying out the reaction at below pH 9 has been found to have the advantage of more readily decomposing weakly acid dissociable cyanides (WAD cyanides) such as zinc, copper, nickel and cadmium complexed cyanides.

DRAWINGS

In the drawings, FIG. 1 is a graph showing the changes in cyanide concentration of an effluent slurry with increasing mole ratios of Caro's acid to inlet cyanide (CA/CN—). FIG. 2 is a graph showing the change in effluent pH of a slurry with increasing mole ratios of Caro's acid to inlet cyanide (CA/CN—).

DETAILED DESCRIPTION OF THE INVENTION

Figure 1:
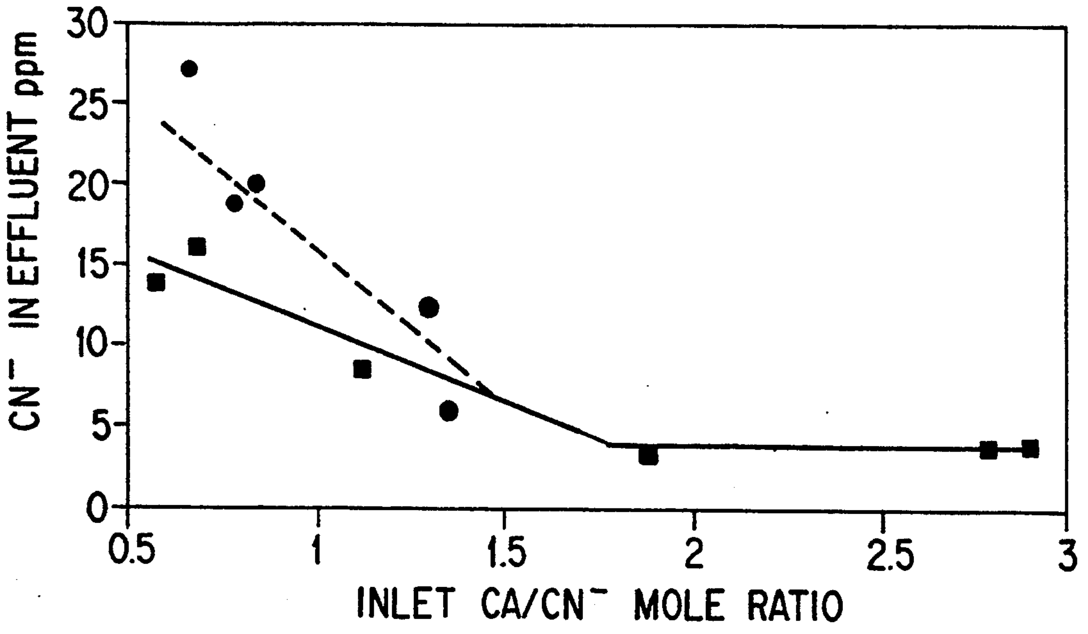

The present invention is especially useful for treating precious metal tailing effluents, such as gold and/or silver mine tailing slurries, and heap leaching solutions, commonly remaining after the ores have been processed to remove the precious metal. The conventional technology employed for recovering these precious metals is first to crush the ores in a series of crushers to −150 mesh (Tyler series) and preferably to −200 mesh (Tyler series) in order to assure good contact of the ore particles with the extracting agent.

The ground ore is then treated in a series of agitated reactors with a lixiviant such as sodium cyanide to extract the gold from the ore. Intermediate steps such as ore flotation and the like may also be used to remove any interfering metals or organic substances before extraction of the ore. The lixiviant solution, typically aqueous sodium cyanide solution, containing the dissolved gold and silver extracted from the residues is then treated by known techniques such as carbon treatment, zinc displacement or the like to recover the gold and/or silver from the sodium cyanide solution, which barren solution is then recycled for further use.

The separated, remaining tailings may be subjected to a washing step to recover additional cyanide values or they may be passed directly into a tailing pond in the form of a thickened slurry as a tailings effluent containing various amounts of residual cyanide. These tailing ponds must be treated to lower their cyanide values to prevent wildlife fatalities, especially migrating birds and birdlife which are deleteriously affected by cyanide concentrations over about 25 parts per million.

Another technique for recovery of precious metals from the crushed ore is to heap leach the ore by passing sodium cyanide solution through a heap of the ore. After the precious metals have been extracted, the heap is washed with water to remove residual cyanides, and the effluent wash water sent to a pond which must be treated to detoxify the cyanides.

In carrying out the present process, the Caro's acid is produced by reacting sulfuric acid and hydrogen peroxide together, preferably in a continuous manner, by using a mixing head or tubular reactor, such as a static or inline mixer or turbulator to mix the two reagents together in intimate fashion. The sulfuric acid can be of any concentration from about 85% by weight up to about 98% by weight $H_2SO_4$ with about 93 weight percent sulfuric acid being preferred because of its ready availability and workability. Hydrogen peroxide can be of any concentration from about 50 weight percent $H_2O_2$ to about 90 weight percent $H_2O_2$ with 70 weight percent hydrogen peroxide being preferred because of safety considerations and because the lower amount of water in the 70 weight percent hydrogen peroxide is desirable in this system. The mole ratio of sulfuric acid to hydrogen peroxide ($H_2SO_4/H_2O_2$) can range from about 1/1 to about 3/1 with about 2/1 to about 2.5/1 being preferred. The reaction results in Caro's acid being formed in a solution which is an equilibrium mixture of hydrogen peroxide, sulfuric acid, Caro's acid and water. The equation for this reaction is set forth below.

$$H_2SO_4 + H_2O_2 \rightleftharpoons H_2SO_5 + H_2O$$

In this reaction, the presence of water in the reaction mixture is undesired since it acts to inhibit formation of $H_2SO_4$ and to hydrolyze the resulting $H_2SO_5$ back into $H_2SO_4$ and $H_2O_2$. For this reason, it is desired to minimize the presence of water by using concentrated sulfuric acid and concentrated hydrogen peroxide to increase the yield of Caro's acid. Further, since sulfuric acid is a very strong dehydrating agent, it is desired to employ excess amounts of sulfuric acid relative to the water formed in the reaction so that it takes up the water as a hydrate and prevents it from inhibiting the Caro's acid formation in the reaction. However, use of extremely large amounts of sulfuric acid is wasteful since the additional amounts of Caro's acid formed is not commensurate with the cost of the excess sulfuric acid required to obtain the somewhat higher amounts of Caro's acid formed. For these reasons, the optimum ratio for producing Caro's acid commensurate with economical amounts of sulfuric acid employed is obtained when the mole ratio of $H_2SO_4/H_2O_2$ is about 2/1 to about 2.5/1. A typical composition prepared from a 2.5/1 mole ratio of 93 weight percent sulfuric acid and 70 weight percent hydrogen peroxide is as follows: Caro's acid (peroxymonosulfuric acid) 25 weight percent; sulfuric acid 57 weight percent; hydrogen peroxide 3.5 weight percent; and water 14.5 weight percent.

Because of the poor stability of the Caro's acid thus formed at the elevated reaction temperatures, it is essential that the Caro's acid be formed on site where it is to be added to the tailing slurry. In practice, the conduit pipes from the sulfuric acid and hydrogen peroxide storage tanks have regulators which allow controlled amounts of these reagents to be passed into a Caro's acid reactor continuously. The proportion of sulfuric acid to hydrogen peroxide is thus monitored at preset levels and the total volume of the reactants that are added to the Caro's acid reactor are set so that the desired mole ratio of Caro's acid to cyanide added to the treated effluent is controlled within predetermined limits.

If the tailing slurry from a precious metal extracting plant is discharged on a continuous basis, then the sulfuric acid and hydrogen peroxide are continually metered into the Caro's acid generator and the resulting Caro's acid solution is immediately and continuously passed into the slurry at the predetermined ratio of Caro's acid to cyanide desired in the tailing slurry. If the tailing slurry is released on a batch basis, the hydrogen peroxide and sulfuric acid metering valves are turned on and the resulting Caro's acid added during the period the tailing slurry is being discharged and then turned off when the discharge has been completed. The tailing slurry issuing from the extraction mill normally has a pH of 9 or above up to about 11.5 with the normal pH being about 10.5 to 11.5. This alkaline pH of the tailings slurry is employed to extract the gold ore with cyanide solution at a pH which gives the most workable extraction of the gold in the ore. This normally occurs under highly alkaline conditions with pH's of 10.5 to 11.5 being preferred, but in all cases with cyanide solutions having pH's of at least 9. This alkalinity is obtained not solely from the sodium cyanide solution which is naturally alkaline, but also due to added alkaline agents such as lime (CaO) or caustic soda (NaOH) to further boost the pH to the optimum range desired.

In the instant process, the Caro's acid is normally added to the tailing slurry (having a pH of at least 9) in the absence of any added alkaline materials so as to commence the reaction of the cyanide with the added Caro's acid at the alkaline pH of the tailing slurry. This invariably is at a pH of at least 9 and at a temperature of about 0° C. to about 80° C., preferably about 10° C. to about 45° C. Under these conditions, the "free cyanides" which are completely dissociated under these alkaline conditions, are readily and quickly detoxified. It should be noted that the cyanides in the tailing slurry are generally of two types. The first are the "free cyanides" such as sodium cyanide which are not complexed and which generally are completely dissociated in the highly alkaline tailing slurry which has a pH of at least 9 and usually 10.5 to 11.5. The second type are the "WAD cyanides" which are the weakly acid dissociable cyanides which are complexed cyanides with various metals found in the tailing slurry such as zinc, copper, nickel, or cadmium.

As the Caro's acid continues to be added to the tailing slurry and the reaction between cyanide and Caro's acid continues to take place, the highly acidic Caro's acid mixture begins to reduce the pH of the tailings slurry to below 9. In general, the operative range of Caro's acid addition is when the mole ratio of Caro's acid to cyanide reaches about 0.3/1 to about 3/1. Obviously, if the starting cyanide value is high, for example, over 100 ppm of cyanide, the amount of Caro's acid mixture added to the tailing slurry, at any given Caro's.acid/-CN— ratio, will be much greater than if the commencing cyanide concentration of the tailing slurry is relatively low, for example, 40 ppm of cyanide. This variation in the total amount of Caro's acid added, in response to the cyanide concentration, will effect the final pH of the treated slurry. In the case of tailing slurries having high cyanide values, the pH will drop to lower pH levels, for example, pH of 6.5, than will be the case where the starting cyanide concentration is lower, for example, pH of 8. Also, final pH values will vary depending on the ore composition and the amount of alkali employed in the cyanidation process. However, we have found in our process that when the mole ratio of Caro's acid to cyanide is employed in the appropriate amounts within the range of about 0.3/1 to about 3/1, the pH of the treated tailing slurry will drop below about pH 9.

As the added Caro's acid commences to react with the cyanide values at lower pH values than 9, the reaction between the WAD cyanides and the Caro's acid becomes more complete. That is, the WAD cyanides are more readily attacked by the Caro's acid at the lower pH values below 9 because of increased dissociation of the WAD cyanides at the lower pH. As will be understood, some of the WAD cyanides are more resistant to reaction with Caro's acid than others, depending on the metal complexed with the cyanide, but overall the reaction of the WAD cyanides with the Caro's acid is materially improved when the pH of the tailing slurries drops below 9 and the reaction between the Caro's acid and the cyanides take place at such lower pH's.

The overall reaction of the cyanides with Caro's acid can be expressed as follows:

$$H_2SO_5 + CN^- \rightarrow H_2SO_4 + CNO^-$$

The cyanate ($CNO^-$) then hydrolyzes as follows:

$$CNO^- + 2H_2O \rightarrow NH_3\uparrow + CO_2\uparrow + OH^-$$

The added Caro's acid is designed to reduce the concentration of cyanides in the tailing slurry preferably to about 25 ppm or less. This concentration is based on ppm in the supernatant solution. This appears to be the threshold level at which birdlife is not effected by these cyanide concentrations in the ponds. The use of Caro's acid in the above mole ratio of Caro's acid to cyanide of about 0.3/1 to about 3/1 and preferably about 1/1 to about 2/1 are effective in reducing these cyanide values to these limits. As the mole ratio of Caro's acid is increased within this range, the level of cyanides will decrease to single digits expressed as parts per million of cyanide remaining in the treated tailing stream. By carrying out the reaction with Caro's acid in the absence of any added alkali, the reaction commences at typical pH's of the tailings slurry, for example, 10.8, where free cyanides react readily. Thereafter, the Caro's acid continues to react with the cyanide in the tailing slurry as the pH drops below pH 9, for example, pH of 6.5 so that the reaction between the Caro's acid and the cyanide continues to take place at the lower pH ranges where the WAD cyanides more readily dissociate and react with the Caro's acid.

In carrying out the present process both in the laboratory and in field trials, in all but one case no detectable amounts of hydrogen cyanide were found as a result of lowering the pH below 9 and carrying out the reaction with Caro's acid at these reduced pH values. In one field test, carried out within a building where cyanide extraction of ores was taking place, it was observed that some hydrogen cyanide was detected between 0 and 2 ppm. This is still much less than the 5 ppm the internal alarm is set at to indicate the presence of HCN in the building. While it is still not confirmed that the HCN gas detected was present as a result of lowering the pH to below 9 because of possible hydrogen cyanide contamination from other sources in the building, it was noted as a possibility. Further, although it is known that untreated sodium cyanide solutions which are rendered neutral or acidic can give off hydrogen cyanide gas, applicants have found that in their present process no problem was found with hydrogen cyanide gas evolution since in almost every instant no detectable amount of hydrogen cyanide was found. While it is not known with certainty why HCN evolution does not occur, it is believed that the present oxidant, Caro's acid, is such a strong oxidizing agent that it reacts with any hydrolyzed free cyanides very quickly before any HCN gas can escape from the solution. In other words, the "free cyanides" reacts so quickly in the initial reaction that no HCN gas is formed that can escape from the solution. As the Caro's acid continues to react with the cyanide in the tailing slurry at lower pH's the remaining cyanides that have not reacted with the Caro's acid are the more stable WAD cyanides. Since these WAD cyanides are not readily dissociable, they do not readily convert to "free cyanides" and thus in turn do not convert to HCN gas. With decreasing pH's, these WAD cyanides will dissociate and as they do so they react readily with the Caro's acid and thereafter are not available to form HCN.

As we have stated earlier, prior workers emphasize the importance of maintaining cyanide solutions being treated with Caro's acid at pH of 9 and above to (1) minimize release of HCN to the atmosphere and (2) to maximize the rate and degree of detoxification of the cyanides. By carrying out the present process, in which the tailing slurry is treated with Caro's acid initially at pH's above 9 and subsequently at pH's below 9, the reaction of Caro's acid with the dissociated, free cyanide in the slurry proceeds so rapidly that the dissociated cyanide that comes in contact with the Caro's acid is detoxified before it has a chance to pass off as hydrogen cyanide in the atmosphere. Further, when carrying out the reaction at pH below 9 the remaining cyanide values that are present as WAD cyanides can be more readily dissociated at lower pH's which facilitated more thorough detoxification than at pH's above 9. Further, it has been found that the rate of cyanide detoxification below pH 9 is entirely adequate to reduce the cyanide values to environmentally acceptable limits.

FIG. 1 is a graph which shows the concentration (as ppm) of cyanides (free cyanides plus WAD cyanides) in a treated slurry in the vertical axis verses the amount of Caro's acid added to the slurry relative to the initial total cyanide content of the slurry (expressed as mole ratio of Caro's acid to total cyanide or "CA/CN—") in the horizontal axis. These are taken from the results of Examples 1-7 and other such similar runs made as set forth in Example 1 with average total cyanide values of 40 ppm and 108 ppm. As will be seen in FIG. 1, the remaining concentration of total cyanides in the treated slurry decreases as the CA/CN— mole ratio increases. However, once the CA/CN— mole ratio reaches a value of about 2, the cyanide concentration levels off at about 4 ppm and even larger amounts of added Caro's acid to cyanide, i.e., mole ratio CA/CN— of almost 3 do not lower the residual cyanide concentration. This is probably due to the fact that these are very stable WAD cyanides which do not dissociate and which, therefore, cannot be attacked by the additional Caro's acid added to the slurry.

Figure 2:
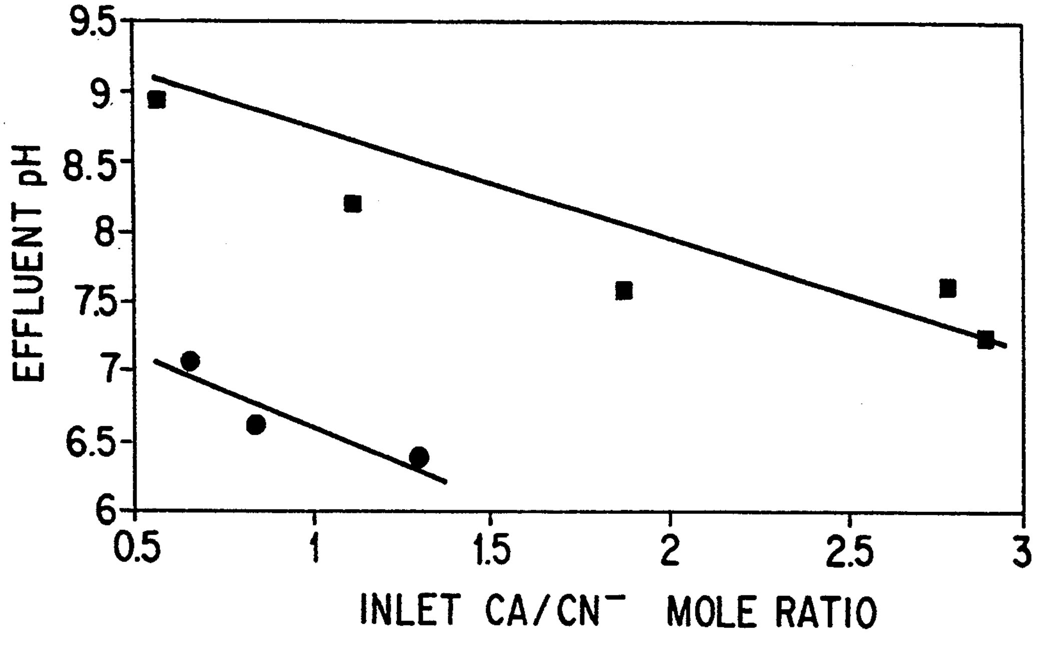

In similar fashion, FIG. 2 compares the pH of the treated tailing slurry in the vertical axis versus the mole ratio of Caro's acid to initial cyanide (CA/CN—) employed in the treatment process in the horizontal axis. As will be observed in FIG. 2, the pH of the treated slurry drops as the mole ratio of Caro's acid to initial cyanide (CA/CN—) increases at any given starting amounts of cyanide in the tailing slurry. However, when the starting slurry contains lower amounts of cyanide, the pH.drops much less than is the case where the inlet cyanide concentrations are much higher. This is because at any given CA/CN— ratio, the amount of Caro's acid (CA) added to a slurry decreases as the CN— concentration decreases. In turn, the smaller amount of Caro's acid (CA) added to such slurry, decreases the pH of the treated slurry less than larger amounts of CA.

Thus, for example, at a mole ratio of Caro's acid to cyanide of between 1 and 1.5 in the initial starting slurry, containing on average about 40 ppm of inlet cyanide, the pH will be reduced to about 8.2 whereas in the more concentrated slurry having an inlet cyanide concentration of about 108 ppm, the pH will be reduced to about 6.4. In all of the runs, the commencing pH of the tailing slurry before Caro's acid addition averaged about 10.5. This demonstrates that as higher Caro's acid to cyanide mole ratios are selected, the pH of the final slurry will always decrease, with the final pH being determined by the amount of starting cyanide in the inlet tailing slurry.

While the foregoing discussion describes the practice of the invention with respect to treatment of slurry tailings remaining after precious metal ore extractions, the instant process is equally suitable for treating cyanide-containing effluents from other sources including, but without limitation, effluent wash solutions from heap leaching, effluents from electroplating processes and effluents from cyanide producing processes.

In the examples set forth below, the term "percent" or "%" means weight percent unless otherwise stated.

EXAMPLE 1

To a 6,400 GPM stream of tailings slurry at pH 10.6 and 23° C. and containing 39.6 wt % solids, 27.0 ppm free CN— and 17.5 ppm WAD CN— was added 2.52 gallons per minute (GPM) of 25 wt % Caro's acid solution (1.12/1 inlet mole ratio Caro's acid/CN—). The 25 wt % Caro's acid solution was prepared by combining 0.52 GPM of 70% $H_2O_2$ with 2.00 GPM of 93% $H_2SO_4$ (2.5/1 mole ratio $H_2SO_4/H_2O_2$) using an inline static mixer as the Caro's acid generator. The Caro's acid generator was positioned above the tailings slurry. As the Caro's acid was formed, it immediately dropped into the tailings slurry contained in a tailings sump with the following dimensions: 12 ft long by×8.5 ft wide×10 ft high. The average height of tailings slurry in the sump is 4 ft. The Caro's acid quickly mixed with the tailing slurry, reacted rapidly with the cyanide (CN—) and lowered the pH of the slurry. The treated tailings traveled through two 8 inch HDPE (high density polyethylene lines) lines to a tailings pond. The total detention time was approximately 20 minutes. Samples of the treated tailings slurry were collected, filtered through a pressure filter and the filtrate analyzed for free CN—, WAD CN—, pH and temperature. See Table 1 for results.

EXAMPLE 2

Effect of increasing Caro's acid/CN— mole ratio from 1.12/1 to 2.9/1.

To a 6,099 GPM stream of tailings slurry at pH 10.7 and 22° C. and containing 39.0 wt % solids, 23.8 ppm free CN— and 13.7 ppm WAD CN—, was added 5.04 GPM of 25 wt % Caro's acid solution (2.9/1 mole ratio Caro's acid/CN—). The 25 wt % Caro's acid solution was prepared by combining 1.04 GPM of 70% $H_2O_2$ with 4.00 GPM of 93% $H_2SO_4$ (2.5/1 mole ratio $H_2SO_4/H_2O_2$) using a Caro's acid generator. The remainder of the procedure was as described in Example 1. See Table 1 for results.

EXAMPLE 3

Effect of decreasing mole ratio of Caro's acid/CN— to 0.57/1 and decreasing mole ratio of $H_2SO_4/H_2O_2$ to 2/1.

To a 6,400 GPM stream of tailings slurry at pH 10.6 and 18° C. and containing 40.0 wt % solids, 26 ppm free CN— and 20 ppm WAD CN—, was added 1.19 GPM of 27 wt % Caro's acid solution (0.57/1 mole ratio Caro's acid/CN—). The 27 wt % Caro's acid solution was prepared by combining 0.29 GPM of 70% $H_2O_2$ with 0.90 GPM of 93% $H_2SO_4$ (2/1 mole ratio $H_2SO_4/H_2O_2$) using a Caro's acid generator. The remainder of the procedure was as described in Example 1. See Table 1 for results.

EXAMPLE 4

Effect of increasing the mole ratio of Caro's acid/CN— to 2.8/1.

To a 6,716 GPM stream of tailings slurry at pH 10.4 and 19° C. and containing 41.0 wt % solids, 18.8 ppm free CN— and 21 ppm WAD CN— was added 5.25 GPM 27 wt % Caro's acid solution (2.8/1 mole ratio Caro's acid/CN—). The 27 wt % Caro's acid solution was prepared by combining 1.30 GPM of 70% $H_2O_2$ with 3.95 GPM of 93% $H_2SO_4$ (2/1 mole ratio $H_2SO_4/H_2O_2$) using a Caro's acid generator. The remainder of the procedure was as described in Example 1. See Table 1 for results.

EXAMPLE 5

Effect of using a tailing slurry having higher CN— concentration and a mole ratio of Caro's acid/CN— of 0.66/1 and increasing the mole ratio of $H_2SO_4/H_2O_2$ to 2.5/1.

To a 5,600 GPM stream of tailings slurry at pH 10.7 and 18° C. and containing 41.0 wt % solids, 86.5 ppm free CN— and 28.5 ppm WAD CN—, was added 3.15 GPM of 25 wt % Caro's acid solution (0.66/1 mole ratio Caro's acid/CN—). The 25 wt % Caro's acid solution was prepared by combining 0.65 GPM of 70% $H_2O_2$ with 2.50 GPM of 93% $H_2SO_4$ (2.5/1 mole ratio $H_2SO_4/H_2O_2$) using a Caro's acid generator. The remainder of the procedure was as described in Example 1. See Table 1 for results.

EXAMPLE 6

Effect of using a mole ratio of Caro's acid/CN— of 1.07/1.

To a 6,390 GPM stream of tailings slurry at pH 10.8 and 18.5° C. and containing 40.8 wt % solids, 83.4 ppm free CN— and 29.3 ppm WAD CN—, was added 5.48 GPM of 25 wt % Caro's acid solution (1.07/1 mole ratio Caro's acid/CN—). The 25 wt % Caro's acid solution was prepared by combining 1.13 GPM of 70% $H_2O_2$ with 4.35 GPM of 93% $H_2SO_4$ (2.5/1 mole ratio $H_2SO_4/H_2O_2$) using a Caro's acid generator. The remainder of the procedure was as described in Example 1. See Table 2 for results.

EXAMPLE 7

Effect of decreasing the mole ratios of caro's acid/-CN— to 0.78/1 and of $H_2SO_4/H_2O_2$ to 2/1.

To a 5,700 GPM stream of tailings slurry at pH 10.7 and 19° C. and containing 39.6 wt % solids, 86.1 ppm free CN— and 15.4 ppm WAD CN—, was added 3.32 GPM of 25 wt % Caro's acid solution (0.78/1 mole ratio Caro's acid/CN—). The 25 wt % Caro's acid solution was prepared by combining 0.82 GPM of 70% $H_2O_2$ with 2.50 GPM of 93% $H_2SO_4$ (2/1 mole ratio $H_2SO_4/H_2O_2$) using a Caro's acid generator. The remainder of the procedure was as described in Example 1. See Table 1 for results.

EXAMPLE 8

To determine the speed of CN— detoxification, the following laboratory experiment was performed.

To 100 gms tailings slurry with an assay of 108 ppm total cyanide (both WAD CN— plus free CN—) and contained in a pyrex beaker with a magnetic stirrer, was added 0.114 gms of 25% Caro's acid (1/1 mole ratio Caro's acid/CN—). A sample of slurry was withdrawn after 30 seconds and passed through a filter paper. A 1 ml sample of filtrate was immediately withdrawn and analyzed using a picric acid method for total cyanide (WAD CN— plus free CN—). The total time for processing the sample up to the point of spectrophotometric, picric acid procedure analysis at 520 nm took 80 seconds. Samples were also processed after 220 and 664 seconds. Results are in Table 2.

EXAMPLE 9

The following laboratory example was carried out to show the effect that pH of the solution being treated has on WAD CN— detoxification. The solutions employed contained larger than normal concentrations of WAD CN— than is normally found in tailing solutions to more clearly demonstrate the results obtained at different pH values.

To prepare a WAD (weakly acid dissociable) cyanide of copper, 38 gms of a 1 wt % $CuSO_4.5H_2O$ solution was added to 28 gms of a 1 wt % NaCN solution. A clear colorless solution resulted. The solution was divided into two portions. One portion was adjusted to pH 6.6 with $H_2SO_4$ and the second portion was adjusted to pH 10.5 with NaOH. Each portion was diluted 1/9 by wt with deionized water. To 80 gms of each diluted solution was added 0.476 gms of 25 wt % Caro's acid while maintaining the pH at 6.6 and 10.5 respectively by the addition of sodium hydroxide solution. After 1 hr, a 1 ml aliquot of each solution was taken for a WAD analyses by a spectrophotometric, picric acid analyses at 520 nm. See Table 3 for results.

Following the same procedure above, a nickel cyanide solution was prepared by adding 21.2 gms of 1 wt % nickel sulfate solution to 18 gms of 1 wt % NaCN solution. The solution was divided into two portions and the pH of the two portions adjusted to 6.6 with $H_2SO_4$ and 10.5 with NaOH, respectively. Each portion was diluted 1/9 with deionized water. To 80 gms of each diluted solution was added 0.476 gms of 25 wt % Caro's acid while maintaining the pH at 6.6 and 10.5 respectively by the addition of sodium hydroxide solution. After 1 hr, a 1 ml aliquot of each solution was taken for a WAD analyses by the above spectrophotometric, picric acid analysis at 520 nm. See Table 3 for results.

As will be observed from the results, the WAD cyanide of copper is reduced by Caro's acid to 13 ppm at pH 10.5 but at pH 6.6 it is reduced to 0. The WAD cyanide of nickel, which is more refractory than the WAD cyanide of copper, is not reduced at all at pH 10.5 by the added Caro's acid. However, at pH 6.6, the WAD cyanide of copper is reduced 37% from 276 ppm to 173 ppm.

TABLE I

| Example | Mole Ratio Caro's/ CN— | Mole Ratio H2SO/ H2O2 | Flow Rates 70% H2O2 | Flow Rate 93% H2SO4 | Caro's Acid wt % | Caro's Acid Soln GPM | Inlet Free CN— | Inlet WAD CN— | Inlet pH | Outlet Free CN— | Outlet WAD CN— | % Free CN— Destroyed | % WAD CN— Destroyed | Outlet pH | HCN PPM Over Sump |
|---|---|---|---|---|---|---|---|---|---|---|---|---|---|---|---|
| 1 | 1.12/1 | 2.5/1 | 0.52 | 2.00 | 25 | 2.52 | 27.0 | 17.5 | 10.6 | 0.0 | 8.5 | 100.0 | 51.4 | 8.5 | 0 |
| 2 | 2.9/1 | 2.5/1 | 1.04 | 4.00 | 25 | 5.04 | 23.8 | 13.7 | 10.7 | 0.0 | 4.2 | 100.0 | 69.4 | 7.3 | 0 |
| 3 | 0.57/1 | 2/1 | 0.29 | 0.90 | 27 | 1.19 | 26.0 | 20.0 | 10.6 | 1.8 | 12.2 | 93.1 | 39.0 | 8.9 | 0 |
| 4 | 2.8/1 | 2/1 | 1.3 | 3.95 | 27 | 5.25 | 18.8 | 21.0 | 10.4 | 0.0 | 4.0 | 100.0 | 81.0 | 7.6 | 0 |
| 5 | 0.66/1 | 2.5/1 | 0.65 | 2.5 | 25 | 3.15 | 86.5 | 28.5 | 10.7 | 6.8 | 20.3 | 92.1 | 28.8 | 7.1 | 0–2 |
| 6 | 1.07/1 | 2.5/1 | 1.13 | 4.35 | 25 | 5.48 | 83.4 | 29.7 | 10.8 | 3.4 | 12.9 | 95.9 | 56.6 | 6.5 | 0 |
| 7 | 0.78/1 | 2/1 | 0.82 | 2.50 | 27 | 3.32 | 86.1 | 15.4 | 10.7 | 5.1 | 13.6 | 94.1 | 11.7 | 7.5 | 0 |

TABLE 2

| Time Seconds | (WAD + Free) CN— ppm |
|---|---|
| 0 | 108 |
| 80 | 8 |
| 220 | 7 |
| 664 | 5 |

TABLE 3

| Run | WAD Type | Mole Ratio Caro's/CN— | pH | WAD CN— ppm | WAD CN— % Decrease |
|---|---|---|---|---|---|
| Control | Cu | 0/1 | 10.5 | 218 | 0 |
| 48-6 | Cu | 1.5/1 | 6.6 | 0 | 100 |
| 48-7 | Cu | 1.5/1 | 10.5 | 13 | 94 |
| Control | Ni | 0/1 | 10.5 | 276 | 0 |
| 48-8 | Ni | 1.4/1 | 6.6 | 173 | 37.3 |

TABLE 3-continued

| Run | WAD Type | Mole Ratio Caro's/CN— | pH | WAD CN— ppm | WAD CN— % Decrease |
|---|---|---|---|---|---|
| 48-9 | Ni | 1.4/1 | 10.5 | 276 | 0 |

We claim:

1. A process for treating an effluent containing cyanide and having a pH of at least 9 to reduce its cyanide levels comprising adding Caro's acid to the tailings effluent having a pH of at least 9 and commencing the reaction of cyanide therein with Caro's acid at a temperature of about 0° C. to about 80° C., adding sufficient amounts of Caro's acid within the mole ratio of Caro's acid to cyanide of 0.3/1 to 3/1 to reduce the pH of the effluent to below 9, continuing to react the cyanide values in the effluent having a pH below 9 with the Caro's acid, reducing the amount of cyanides remaining in the effluent and recovering an environmentally compatible effluent having lower amounts of cyanide.

2. Process of claim 1 wherein said reaction is commenced at a temperature of about 10° C. to about 45° C.

3. Process of claim 1 wherein said effluent has a pH of about 10.5 to about 11.5.

4. Process of claim 1 wherein said mole ratio of Caro's acid to cyanide employed is about 1/1 to about 2/1.

5. Process of claim 1 wherein the pH of said effluent is reduced to a pH below 9 but not lower than about 6.5.

6. Process of claim 1 wherein the total cyanide concentration in the effluent being treated is from about 40 ppm to about 108 ppm.

7. Process of claim 1 wherein the Caro's acid is produced by reacting sulfuric acid and hydrogen peroxide in a mole ratio of about 2/1 to about 2.5/1.

8. Process of claim 1 wherein the cyanide concentration of the effluent is reduced to no higher than about 25 ppm.

9. Process of claim 8 wherein the cyanide concentration is reduced to between about 4 ppm and 25 ppm.

10. Process of claim 1 wherein the Caro's acid is added to said effluent in the absence of an added alkali.

* * * * *